United States Patent [19]

Newman et al.

[11] 4,235,352
[45] Nov. 25, 1980

[54] WATER SUPPLY APPARATUS

[75] Inventors: Alec T. Newman; David Rhodes, both of Banbury, England

[73] Assignee: General Foods Limited, Banbury, United Kingdom

[21] Appl. No.: 854,241

[22] Filed: Nov. 23, 1977

[30] Foreign Application Priority Data

Dec. 1, 1976 [GB] United Kingdom ............... 50171/76

[51] Int. Cl.³ ............................................. B67D 5/52
[52] U.S. Cl. ................................... 222/129; 137/565; 141/360; 222/255; 222/333
[58] Field of Search ................................. 417/316–318, 417/26; 239/76; 137/565; 222/129, 129.1–129.4, 255, 333, 63; 141/362, 360, 358, 243

[56] References Cited

U.S. PATENT DOCUMENTS

| 2,831,609 | 4/1958 | Montbriand et al. | 222/129 X |
| 3,049,267 | 8/1962 | Edwards et al. | 222/255 X |
| 3,237,593 | 3/1966 | Trotter | 222/63 X |
| 3,369,489 | 2/1968 | Schaub | 137/565 X |
| 3,800,826 | 4/1974 | McCann | 222/129.1 X |

Primary Examiner—Robert J. Spar
Assistant Examiner—Edward M. Wacyra
Attorney, Agent, or Firm—Kenyon & Kenyon

[57] ABSTRACT

This invention provides water supply apparatus having a water reservoir serving two or more nozzles, a pump for pumping the water to the nozzles, a valve for opening and closing a respective nozzle and apparatus for varying the rate of pumping of the pump in accordance with the number of valves which are open.

2 Claims, 3 Drawing Figures

WATER SUPPLY APPARATUS

This invention relates to water supply apparatus.

According to the present invention there is provided water supply apparatus comprising:
a body;
a reservoir for water within the body;
two or more outlet nozzles mounted on the body;
means for pumping water from the reservoir to each nozzle;
valve means for each nozzle for opening and closing its respective nozzle; and
means for varying the rate of pumping of the means for pumping in accordance with the number of valves, which are open.

A specific embodiment of the invention will now be described with reference to the accompanying drawings in which.

Many known beverage vending apparatus now vend cups, which have been prefilled with dry ingredient(s) or material or cups are so filled by the customer. The beverage is then made by adding hot or cold water. Preferably the water is supplied at a sufficient rate to dissolve the ingredients without causing splashing from the cup.

Figure 2:
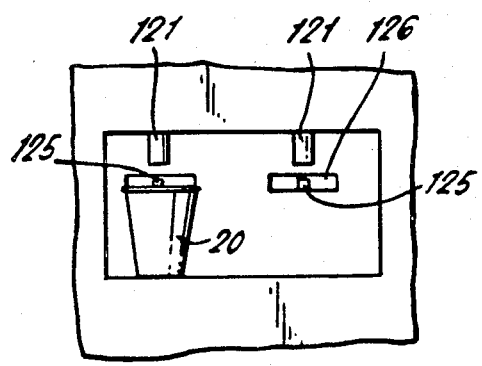
FIG. 2 is a front view of a detail of the water supply apparatus of FIG. 2.
Figure 1:
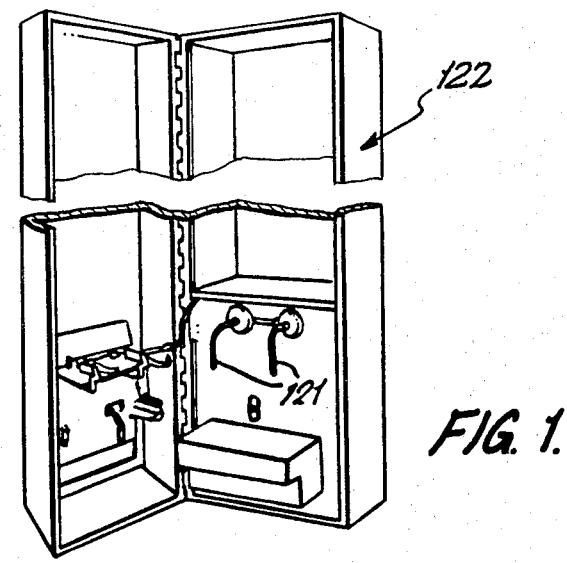
FIG. 1 is a perspective view of water supply apparatus with its door open.
Figure 3:
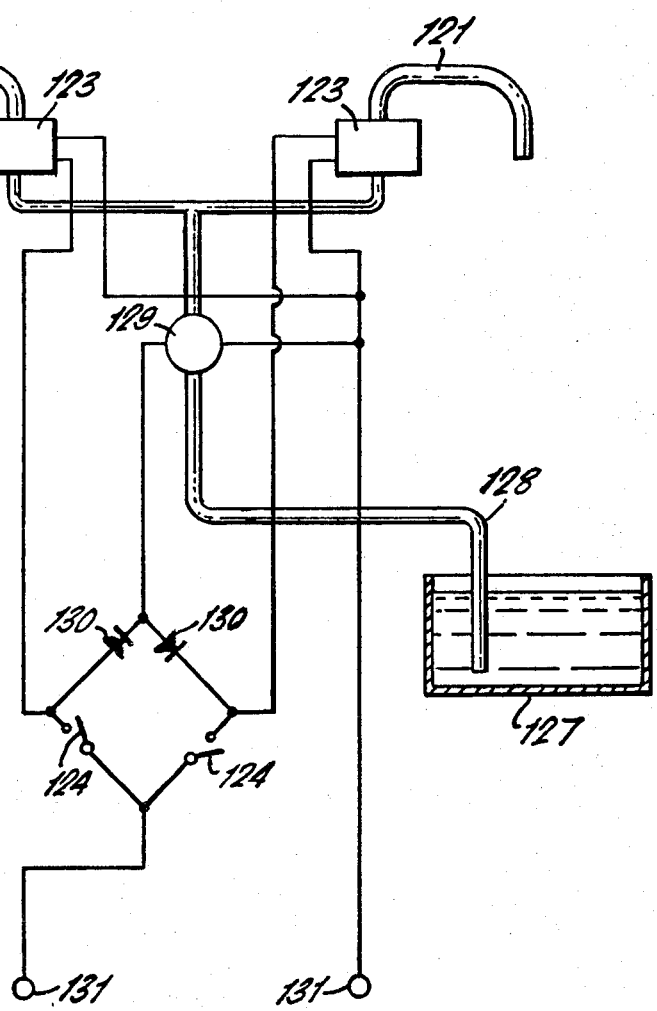
FIG. 3 is a schematic diagram of the water and electric circuits of the water supply apparatus of FIG. 2.

When a customer has obtained a cup with the appropriate dry ingredients in, he places it under a nozzle 121 of water supply apparatus 122. Each nozzle 121 has a valve 123 which is controlled by a respective switch 124 (see FIG. 3) the operating element 125 of which is seated in a recess 126 and is operated by the customer pressing the rim of the cup 20 against the operating element 125 of the switch 124. Preferably water supply apparatus 122 is a separate body from the vending apparatus 10. However, if desired, it can be housed within the same body.

It will be appreciated that the recesses 126 could be formed lower down and enlarged so that the operating elements 124 could be operated by the body of the cup 20.

Preferably water is fed from a reservoir 127 via a pipe 128 to the nozzles by an electrically operated pump 129. In order to maintain a constant flow through each nozzle 121, whether or not the other nozzle is operated, each switch 124 is connected in series with a respective diode 130, the diodes being connected in parallel front to back relationship, and the complete diode circuit being connected in series between inputs 131 and the pump 129. When only one of switches 124 is closed the supply to the motor is half-wave rectified and when both switches are closed the supply is full wave rectified. Thus the pump 129, is run at twice the speed when two nozzles 121 are being used as compared with when only one is being used. In this way the flow rate through the nozzles 121 is maintained constant at a suitable rate to dissolve the dry ingredient(s) or material.

We claim:

1. Water supply apparatus comprising: a body; a reservoir for water within the body; two outlet nozzles mounted onto the body; means for pumping water from the reservoir to each nozzle; valve means for opening and closing each outlet nozzle; means for varying the rate of pumping of the means for pumping in accordance with the number of valves, which are open, so as to maintain a rate of flow above a predetermined level through each open nozzle, each said valve means being operable by an electrical switch having an operating element, each operating element being disposed adjacent the outlet end of its respective nozzle in a recess formed in the body of the apparatus such that the switch can be operated, in use, by pressure transmitted through a container being filled, said means for pumping being electrically driven, said means for varying the rate of pumping comprising means for varying the magnitude of the electrical power supplied to the means for pumping, said means for varying the magnitude of the electrical power comprising a pair of diodes in parallel front to back relationship together connected in series with the means for pumping and a power input, each diode being connected in series with a respective one of said switches.

2. Water supply apparatus comprising:
a body;
a reservoir for water within the body;
two outlet nozzles mounted on the body;
means for pumping water from the reservoir to each nozzle;
valve means for opening and closing each nozzle, wherein each of said valve means is operable by an electric switch;
means for varying the rate of pumping of the means for pumping in accordance with the number of valves which are open so as to maintain a rate of flow above a predetermined level through each open nozzle, wherein the means for pumping is electrically driven and wherein the means for varying the rate of pumping comprises means for varying the magnitude of the electrical power supplied to the means for pumping;
said means for varying the magnitude of the electrical power comprising a pair of diodes connected in parallel front to back relationship and in series with the means for pumping and a power input, and each diode being connected in series with a respective one of said switches.

* * * * *